United States Patent
Andrews et al.

[11] Patent Number: 5,208,063
[45] Date of Patent: May 4, 1993

[54] MILLING PROCESS FOR CONTROLLING RICE COOKING CHARACTERISTICS

[75] Inventors: Robin D. Andrews, Clear Lake Shores; Deborah Locke, Alvin; John A. Mann, Friendswood; James E. Stroike, League City, all of Tex.

[73] Assignee: RiceTec, Inc., Houston, Tex.

[21] Appl. No.: 671,273

[22] Filed: Mar. 18, 1991

[51] Int. Cl.$^5$ .............................................. A23L 1/00
[52] U.S. Cl. .................................... 426/482; 426/483
[58] Field of Search ................... 426/482, 483; 241/7

[56] References Cited

U.S. PATENT DOCUMENTS 4,522,837 6/1985 Meinardus ........................ 426/482

OTHER PUBLICATIONS

Primo eta l., Factores de calidad de arroz. XIII, Revista del Agroguimica y Technologia de Alimentos, 4(2):238-245 (1964).
Hogan J. T., Rice Journal 1969, 72(7) 54, 56 and 58-62.
Roberts, R. L., Composition and Taste Evaluation of Rice Milled to Different Degrees; Journal of Food Science, vol. 44, No. 1, p. 127.
Juliano, B. O., Cooperative Tests on Cooking Properties of Milled Rice; Cereal Food World, vol. 30, No. 9, p. 651.
Rice: Chemistry and Technology, edited by B. O., Juliano, published by the American Association of Cereal Chemists, 1985.

*Primary Examiner*—George Yeung

[57] ABSTRACT

An improved procedure for varying the cooking characteristics and cooked rice texture of milled white rice. The procedure involves varying only the milling degree to remove either more or less of the aleurone and sub-aleurone layers of the rice grain. A rice variety or hybrid with one set of physicochemical properties may be milled to produce milled white rice having cooked rice qualities and processing behavior normally associated with a different set of physicochemical properties.

9 Claims, 1 Drawing Sheet

MILLING PROCESS FOR CONTROLLING RICE COOKING CHARACTERISTICS

FIELD OF THE INVENTION

This invention relates to methods for milling rice, and more particularly, processes to control the cooking behavior and cooked rice properties of such rice by varying milling methods alone.

BACKGROUND OF THE INVENTION

Rice is one of the leading food crops in the world and many different types of rice are consumed. Quality preferences in various countries and regions are diverse. Preference may originate from naturally occurring local plant types which produce grains with specific properties, or be associated with the utensils available for cooking and eating, or with the nature of local foods which accompany rice and also the availability and convenience of cooking methods. For example, chopsticks are associated with the use of sticky rice, curry eaters prefer dry and fluffy rice, instant rice (precooked, dried and then reconstituted) has different properties but convenience of preparation results in some consumers preferring that type of rice. Some consumers prefer highly polished rice which is very white after cooking, other consumers prefer brown rice which has a higher bran and dietary fiber level.

The rice industry, which includes breeders, farmers, processors and marketers, respond to consumer preferences around the world by developing and producing a vast array of varieties and hybrids of rice and products from rice.

Attempts at controlling the cooking characteristics of a rice variety or hybrid deal with determining various physicochemical parameters of breeds of rice and then cross-breeding or hybridization to arrive at proper amylose content, gelatinization temperature, gel consistency, grain dimensions and other such parameters. Broad classifications for amylose are low, medium and high. Classification for gelatinization temperature are low, intermediate and high. Classification for gel consistency are soft, medium and hard. Grain dimensions are used to classify rice as long, medium or short. These tests and classifications are used for milled raw white rice. The tests and classifications are modified when used for parboiled rice. Amylose has been considered as the most important characteristic for predicting rice cooking and processing behavior. The economic value of the rice grain is largely determined by cooking and processing behavior, grade and milling yield.

The breeding into a rice variety of a combination of desirable physicochemical properties, taste, aroma and elongation during cooking results in considerable breeding time, cost and complexity. For the development of hybrid rice it is necessary to add the complexity of breeding in the traits of male sterility and restoration properties. Breeding and parboiling have been the principal way that cooked rice qualities have been imparted to a particular rice in the prior art.

A process or procedure which reduces the need to breed different combinations of physicochemical properties into a rice, and yet obtain differing cooking characteristics normally associated with such differing properties, would significantly improve the efficiency of producing a commercial rice with particular characteristics.

SUMMARY OF THE INVENTION

The invention is a process for changing the cooking behavior and cooked rice texture of a given milled rice when cooked in a predetermined way and includes the step of varying only the milling degree of the rice by milling the rice to a greater degree to produce cooked rice which is substantially softer and stickier, or by milling the rice to a lesser degree to produce cooked rice which is substantially fluffier and drier.

One aspect of the invention applied to production control includes the steps of obtaining the milling degree of any acceptable rice when cooked, test milling and cooking a second lot of rice, determining the differences in cooking behavior and rice texture when cooked of the acceptable rice and the second lot, and varying only the milling degree of the second lot to compensate for the differences and yield a uniform production run.

Another aspect of the invention includes the steps of selecting a rice having predetermined cooking behavior and texture when well milled and varying only the milling degree of that rice to produce, after the same cooking procedure, either a substantially fluffier and drier cooked rice by milling said rice to a Satake milling degree ("SMD") of about 78 or less, while producing a rice transparency of about 2.0 or greater, or to produce a substantially softer and stickier cooked rice by milling the rice to a SMD of about 100 or greater.

The invention calls for the use of varying and controlled degrees of milling which supplements, and in some cases overrides, the impact of apparent amylose content and other physicochemical characteristics in determining the cooking and processing behavior of white milled rice and the texture qualities of the cooked product. In accordance with the invention one can, for example, take a variety classified as medium amylose and intermediate gelatinization temperature (which normally produces a somewhat dry and fluffy cooked rice product) and by milling to a very high degree produce a rice which cooks sticky and glutinous as if it were produced from a low amylose, low gelatinization temperature class of rice.

In accordance with the invention one can take the same variety, classified as medium amylose and intermediate gel temperature, and by uniformly milling to an unusually low degree produce a white rice product which cooks to produce grains of high integrity and firmness. This product has many of the characteristics of very high amylose rice or parboiled rice. When cooked in excess water, as in the boil-in-bag cooking process, the product is drier and less mushy than when a regular raw well-milled rice is used. When processed into instant rice, the product has better grain integrity and texture. The low milling degree also increases the amount of aroma and taste compound, 2-acetyl-1-pyrroline, in milled aromatic white rice. This compound is present at higher levels in the bran and surface layers of the rice and low levels of milling retain more of the compound in the milled rice.

DESCRIPTION OF THE PREFERRED EMBODIMENT

Figure 1:
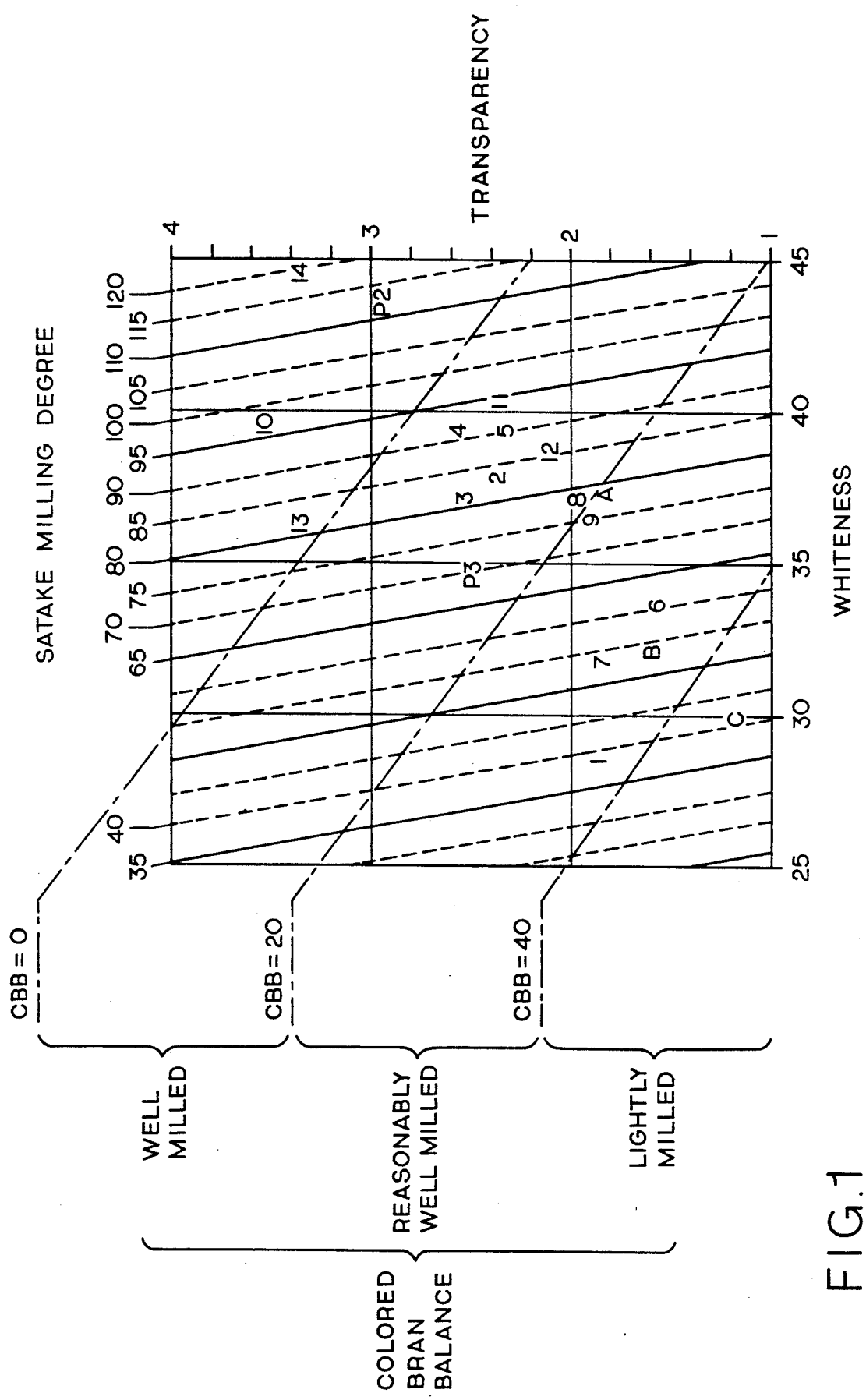
FIG. 1 is a graphical representation showing transparency, whiteness and and Satake milling degrees of several samples of rice as determined by the Satake optical milling degree meter and areas corresponding to surface bran remaining on rice classified by the colored bran balance index.

One embodiment of the present invention involves varying the milling degree of well milled medium amylose, intermediate gelatinization temperature ("gel") rice so that the rice will cook substantially softer and stickier than the well milled rice when cooked in the same way. To achieve that product, the rice is milled to 100 or greater Satake milling degrees. The same rice may be milled to 78 or less Satake milling degrees and display the cooking behavior and dry, fluffy cooked rice texture of low gel, low amylose varieties.

Industry conventions describe methods for measuring the degree of milling and classify the techniques into two main groups: (1) those that estimate the quantity of (a) removed bran or (b) residual bran and (2) those that measure the effects of removal of outer layers of the rice grain on (a) optical characteristics or (b) chemical composition of the final milled product.

The measurement of removed bran can be made by weighing the rice before and after milling. The weights of 1,000 whole grains of rough rice, brown rice and milled rice can be used to measure the percentage by weight of hulls removed to produce brown rice and the percentage by weight of bran removed to produce milled rice. The latter is a measure of degree of milling on a removed bran basis.

Another technique involving the indirect measurement of removed bran utilizes milling efficiency data. When a sample of rice is tested for milling efficiency on a milling test machine (e.g. a McGill machine) usually for a fixed milling time, the total milling efficiency is measured and also the percentage by weight of whole unbroken grains is measured. The percentage by weight of milled rice produced from a given weight of rough rice is known as the total milling efficiency. It will be evident that if the percentage by weight of hulls is constant then changes in total milling efficiency represent changes in the degree of milling on a removed bran basis.

The measurement of residual bran is usually carried out in the U.S. milling industry by the visual comparison of a milled rice sample against USDA standards arranged in a sample box. Each box contains three standards representing the lower limits for "well milled" (U.S. No. 1 and No. 2), "reasonably well milled" (U.S. No. 3 and No. 4), and "lightly milled rice" (U.S. No. 5 and No. 6). A sample is compared to the three standards and graded. A separate sample box is provided for long grain, medium grain and short grain rice to prevent grain shape from detracting from the comparison of surface bran levels.

A more objective evaluation of residual bran utilizes the differential staining of bran and endosperm with May-Grunwald reagent (a mixture of eosin and methylene blue dissoled in methanol) followed by an assessment of the percentage of the grain area (plane image) which is covered by bran. The measurement is known as the Colored Bran Balance (CBB) index. The measurement is made by placing a standard glass plate with an engraved reticle (1 cm grid) over the previously stained grains and the number and percentage of cross-over points located on bran is counted. A lower CBB reading indicates a lesser amount of bran on the rice grain surface.

The Satake Milling Meter measures the optical characteristics of the milled rice. In the Satake Milling Meter (MM-1B, Satake Engineering Co., Ltd., Tokyo, Japan), a halogen lamp provides light which is passed through an intervening filter, center wave length 450 nm, and projected onto the grain sample. The amount of reflected light and transmitted light are measured using a photo diode. The reflected light is displayed as a measure of whiteness (W) and the transmittal light is displayed as a measure of transparency (T) respectively. The two measurements are combined to give a "Satake Milling Degree" (SMD) measurement. Brown rice has a Satake Milling Degree of zero and the SMD increases progressively as the outer layers of the rice are milled away. The removal of 10% by weight of brown rice by milling might give an SMD of 100, for example.

It is necessary to relate selected measurements of white rice milling degree to normal milled industry standards and practice. The following table shows Satake Milling Degree measurements (SMD; W=whiteness; T=transparency), CBB index and percentage of grains with bran for a typical set of USDA milling standards:

| Standard | Grain | W | T | SMD | CBB | % Grains with Bran |
|---|---|---|---|---|---|---|
| Well Milled | Long | 38.2 | 1.78 | 82 | 8 | 67 |
| US #1 and | Medium | 35.3 | 1.78 | 69 | 24 | 99 |
| #2 | Short | 36.9 | 1.74 | 76 | 29 | 99 |
| Mean: | | 36.8 | 1.76 | 76 | 20 | 88 |
| Reasonably | Long | 23.9 | 1.51 | 58 | 37 | 99 |
| Well Milled | Medium | 31.9 | 1.31 | 54 | 39 | 100 |
| US #3 and | Short | 29.8 | 1.20 | 44 | 48 | 100 |
| #4 | | | | | | |
| Mean: | | 31.5 | 1.34 | 52 | 41 | 100 |
| Lightly | Long | 30.6 | 1.13 | 48 | 56 | 97 |
| Milled | Medium | 29.3 | 0.88 | 0 | 63 | 99 |
| US #5 and | Short | 28.3 | 1.16 | 37 | 61 | 100 |
| #6 | | | | | | |
| Mean: | | 29.4 | 1.06 | 28 | 60 | 99 |

The results show that the well milled standard approximates a 20 CBB index, the reasonably well milled standard approximates a 40 CBB index and the lightly milled standard approximates a 60 CBB index. It can be seen that the test measurements of the USDA standards vary somewhat since several varieties are included in the standards and the samples are used on the basis of visual appearance of surface bran level.

It is believed that the optical measurements of milling degree, such as the Satake milling degree meter, provide meaningful determination of grain surface character and of the amount of outer layers of rice which have been removed in milling. With the use of such testing machines, the milling process can be more closely controlled, and the teachings of the present invention applied with wellknown milling equipment to measure the effects of the process embodiments set forth herein.

Key results from the practice of this invention can be understood by examining the following tables. The tables are constructed to summarize the findings from a number of experiments which show the effect of degree of milling, for rices of differing apparent amylose percentage, on cooking behavior and cooked rice qualities.

The range of amylose shown (18% to 30%) covers typical commercial rice varieties excluding waxy rices of extremely low amylose levels. The range of milling degree shown (70 to 115 SMD) extends below normal commercial white rice (about 85 SMD). A low milling degree level of 70 SMD can be achieved with acceptable grade (U.S. No. 1 or No. 2) using the procedures described herein. The range of milling degree shown extends above that normally used for medium amylose commercial white rice (80–95 SMD) to a level of 115 SMD. This high level of milling degree is used commercially for low amylose white rice produced for Asian consumers who prefer highly polished and whitened rice with no traces of bran.

The tabulated results represent rices cooked in a Panasonic Rice Cooker using the measured water technique. The cooked rice firmness measurements are from using a Pabst Texture Tester taking the average shear value of the final two "bites". The stickiness measurements are from experiments where rices of differing properties and cooking conditions but equal firmness are ranked for stickiness and grain integrity. All data has been smoothed statistically to show the primary effects for the cooking procedures and test methods used.

The firmness of cooked rice can be measured using a Pabst Texture Text System. The tester has a one inch cube shear cell which holds 10 gm of cooked rice. The movable cell wall is connected to a force measuring device and has seven teeth which mesh with five stationary teeth, "biting" the cooked rice sample. During a test the cell wall moves through a programmed cycle of compression and reversals to yield a shear/displacement curve from a connected computer. The temperature of the sample is measured by a thermocouple in the cell. A typical test cycle involves three "bites", the first bite reduces test cell volume by 34%, the second 55% and the final bite is 100%. The test data profiles can be analyzed in many ways and the profiles of different rice samples precisely compared. In this way, for example, rices of differing starch properties cooked under differing conditions can be evaluated to determine alternative ways of producing rice of identical firmness. The Pabst Texture Test System can utilize different cell designs and compression cycles to explore various characteristics of cooked rice including stickiness.

A simple "cup test" can be used for measuring the grain stickiness of cooked rice. The cooked rice is fluffed with a fork and then carefully spooned into a round flat bottomed cup (height and diameter 2.5 inches). The rice is not pressed into the cup but voids are filled in. A plate is placed over the cup and both are turned over. The cup is carefully removed and the mound of rice is observed for several minutes. Sticky rice maintains the shape of the cup and eventually sets into a glutinous mass and the height and width of the mound are equal. In this case the rice is rated 1 for stickiness. Less sticky rice immediately falls apart when the cup is removed, the shape of the cup disappears and the maximum diameter and height of the mound of separate grains is in the ratio of about 5 to 1. In this case the rice is rated 5 for stickiness. Intermediate degrees of stickiness are rated, 2, 3, and 4.

TABLE 1

Cooked Rice Firmness-Pabst Units Kg
Effect of Milling Degree and amylose %
Constant Water-Rice Ratio of 1.75:1 by Volume

| | Satake Milling Degree | | | | |
|---|---|---|---|---|---|
| | 70 | 85 | 100 | 115 | |
| Low Amylose - 18% | 4.3 | 3.9 | 3.5 | 3.1 | Kg |
| Medium Amylose - 24% | 6.4 | 6.0 | 5.6 | 5.2 | Kg |
| High Amylose - 30% | 8.5 | 8.1 | 7.7 | 7.3 | Kg |

TABLE 2

Cooked Rice Stickiness - Cup Test Units
Effect of Milling Degree and Amylose %
Constant Water-Rice Ratio of 1.75:1 by Volume

| | Satake Milling Degree | | | | |
|---|---|---|---|---|---|
| | 70 | 85 | 100 | 115 | |
| Low Amylose - 18% | 1.73 | 1.51 | 1.29 | 1.06 | Units |
| Medium Amylose - 24% | 2.25 | 2.03 | 1.80 | 1.58 | Units |
| High Amylose - 30% | 2.77 | 2.55 | 2.32 | 2.10 | Units |

TABLE 3

Cooking Time - Minutes
Effect of Milling Degree and Amylose % Constant
Firmness of 6 Kg Maintained by changing Water-Rice Ratio

| | Satake Milling Degree | | | | |
|---|---|---|---|---|---|
| | 70 | 85 | 100 | 115 | |
| Low Amylose - 18% | 19.0 | 17.7 | 16.2 | 14.8 | Min. |
| Medium Amylose - 24% | 22.2 | 20.8 | 19.4 | 18.0 | Min. |
| High Amylose - 30% | 25.3 | 23.9 | 22.5 | 21.1 | Min. |

It will be apparent from the above tables that changes in degree of milling are extremely important relative to cooking behavior and cooked rice properties. Tables 1 and 2 above illustrate that a medium amylose rice with an 85 SMD can be softened and made stickier by milling to a 115 SMD. This product is similar to a low amylose rice at a low milling degree. Table 3 shows that increasing milling degree reduces cooking time in a similar manner to the lowering of amylose. Similarly, medium amylose rice can be milled to a low degree to produce cooking behavior and cooked rice properties more like higher amylose rice.

The significance of these findings can be further illustrated by describing a number of examples in which the cooking qualities of specific varieties are changed by utilizing certain embodiments of this invention.

EXAMPLE 1

Rice variety RTA 1002, a medium amylose, intermediate gelatinization temperature rice, was dehulled and then milled using a Satake commercial abrasion milling machine (Satake Engineering Co., Ltd., Tokyo, Japan, model RMB). When well-milled, this variety is classified medium amylose (24% apparent amylose by weight) intermediate gel (alkali spreading value 2.4). The machine was adjusted to produce a 68 SMD for Sample 1, and readjusted to produce a 92 SMD for Sample 2. A second pass through the machine of Sample 1 product, milled still longer, produced rice Sample 3 with a 116 SMD. The amylose percent and the alkali spreading value of each sample was measured.

Cooking behavior was evaluated by bringing 50 g. samples of milled rice product in excess water to the boil and simmering for various times. Times of 10 minutes, 15 minutes and 20 minutes were evaluated for each sample. The stickiness of each cooked rice sample was assessed using the "cup test" and the moisture content of each cooked rice sample measured.

The results were as follows:

| Sample | Whiteness | Transparency | SMD | Apparent % Amylose | Alkali Spreading Value |
|---|---|---|---|---|---|
| 1 | 35.1 | 1.41 | 68 | 24.1 | 3.4 |
| 2 | 40.4 | 2.05 | 92 | 24.2 | 3.6 |
| 3 | 44.7 | 2.70 | 116 | 25.5 | 3.2 |

| | | | | Cooked Rice | Stickiness |

| Sample | Cook Time | Moisture % | Cup Test |
|---|---|---|---|
| 1 | 10 | 69.0 | 4.5 |
|   | 15 | 71.6 | 4.0 |
|   | 20 | 76.9 | 3.0 |
| 2 | 10 | 72.4 | 2.5 |
|   | 15 | 73.8 | 4.0 |
|   | 20 | 78.4 | 2.0 |
| 3 | 10 | 73.5 | 1.0 |
|   | 15 | 75.6 | 2.0 |
|   | 20 | 77.7 | 1.0 |

The results show that milling rice to a higher degree accelerates the rate of moisture absorption during cooking in excess water and that high milling degree rice is stickier at a given moisture content than low milling degree rice. Measurements of amylose and alkali spreading value show slightly higher apparent amylose measurements on the stickier rice. Higher amylose rice, according to prior art, would be expected to give a less sticky rice. The extraction of lipids from a rice sample before conducting the amylose test is known to increase the amylose measurement of medium amylose rice by about 2 percentage points. Measurements of % amylose on rice without lipids extraction is referred to as "apparent % amylose." All references to "amylose %" herein refer to apparent percent amylose content by weight. The higher apparent amylose levels measured on the high milling degree rice probably reflects the removal of more of the high lipid content outside layers of the grain at high milling degrees. The changes in alkali spreading value with milling degree are not considered significant.

EXAMPLE 2

A sample of RTA 1002 (24% amylose, 3-5 alkali spreading value) was milled to a high milling degree (115 SMD) and cooked and compared to a purchased sample of Jasmine 85 rice, produced and marketed by the Douget-Dishman Rice Company. Jasmine 85 (IR841) is a low (17%) amylose, high gelatinization (alkali spreading value 6.5) rice variety available for purchase in the United States.

Samples were cooked in excess water by dropping 50 g. of rice into simmering water for 10 minutes, 15 minutes, 20 minutes and 25 minutes. The moisture content of the cooked rice samples were compared. Cup test measurements of stickiness were made.

The results were as follows:

| Sample | Whiteness | Transparency | SMD |
|---|---|---|---|
| RTA 1002 | 43.9 | 2.86 | 114 |
| J-85 | 38.2 | 3.40 | 92 |

| Sample | Cook Time | Cooked Rice Moisture % | Stickiness Cup Test |
|---|---|---|---|
| RTA 1002 | 10 | 65.4 | 2.2 |
|   | 15 | 71.2 | 1.9 |
|   | 20 | 75.9 | 1.4 |
|   | 25 | 79.8 | 1.5 |
| J-85 | 10 | 63.8 | 2.6 |
|   | 15 | 70.0 | 2.6 |
|   | 20 | 74.6 | 1.6 |
|   | 25 | 78.0 | 1.6 |

The results showed that the high milling degree, medium amylose, intermediate gelatinization rice (RTA 1002) absorbed water as rapidly as the lower milling degree, low amylose, low gelatinization temperature rice (5-85). Importantly, and contrary to prior art expectations, the medium amylose rice was as sticky as the low amylose rice. The higher milling degree of the medium amylose rice resulted in higher stickiness and a higher rate of cooking than prior art would have suggested.

EXAMPLE 3

Dehulled RTA 1002 is fed continuously to an IRM30 Satake Abrasion Milling Machine using a 30 grit stone at 750 RPM with the back pressure adjusted to achieve a 45 SMD. The output from this machine is fed to a KB40 Satake Polishing Machine operating at 850 RPM with the use of a water/air mixture to soften and remove the bran. The output from the process is a low milling degree rice with a 69 SMD (Whiteness 35, Transparency 2.4). When tested using the May-Grunwald differential dye test the product showed visible bran on 67% of the grains, a Colored Bran Balance index of 8 and the sample was visually determined to surpass the minimum USDA standard for well milled white rice. The cooked rice showed only a small number of grains with bran streaks and was acceptable in overall appearance.

FIG. 1 shows examples of test results using the Satake Milling Degree meter for the USDA standards and various commercial white rice products. Also shown is the product from the process described in this example (P3) and that from Example 2 (P2).

As may be seen by reference to FIG. 1, various commercially available milled white rices were tested for whiteness, transparency and Satake milling degree. Numerals and letters of the rices tested are:

Commercial Brands

1. Texmati Lite Bran, long grain
2. Texmati White Rice, long grain
3. Food Club, long grain
4. Mahatma, long grain
5. Wonder, long grain
6. Seven Star, basmati
7. Al Baari, basmati
8. Super Pari, basmati
9. Rani, basmati
10. Nishiki, medium grain
11. Watermaid, medium grain
12. Kroger, medium grain
13. Kokuho Rose, medium grain
14. Thai Jasmine, long grain

USDA Long Grain Standards

A—Well milled
B—Reasonably well milled
C—Lightly milled

EXAMPLE 4

In this example a rice variety RTA 1002 is milled using three different combinations of abrasion milling and water-polishing steps to produce milled rice of essentially the same degree of milling but with different degrees of polish and surface bran removal. Although elsewhere herein only the term "milling" is used to describe the bran removal operation, it can include polishing steps of varying lengths of time and other polishing conditions, as is well known in the art. The percentage of the grains with bran was measured using the May-Grunwald dye test. The process descriptions show the change in Satake Milling Degree at each step of each process:

| Process | Whiteness | Transparency | SMD | CBB | % of Grains with Bran |
|---|---|---|---|---|---|
| #1 | | | | | |
| Abrasion 56 SMD | 38.7 | 2.39 | 87 | 12 | 60% |
| Abrasion 31 SMD | | | | | |
| Polish 0 SMD | | | | | |
| #2 | | | | | |
| Abrasion 50 SMD | 37.2 | 2.70 | 82 | 4 | 37% |
| Abrasion 20 SMD | | | | | |
| Polish 12 SMD | | | | | |
| #3 | | | | | |
| Abrasion 64 SMD | 36.8 | 3.03 | 83 | 2 | 19% |
| Abrasion 0 SMD | | | | | |
| Polish 19 SMD | | | | | |

No significant differences in cooking behavior were found between the three samples. Bran streaks were visible on the cooked rice samples in line with the results from the May-Grunwald dye test shown above. However the least polished rice, (which had the highest level of bran streaks), was still acceptable and met the USDA standard for well milled rice.

EXAMPLE 5

In this example a very high amylose variety, "LC31", is milled to produce samples of a low milling degree and a high milling degree and compared to samples of a medium amylose variety "Labelle" also milled to a low and high degree.

Samples were cooked in measured water at three water-rice ratios by weight using a Panasonic rice cooker. The cooked rice samples were tested using the Pabst Texture Test System and the Cup Test for stickiness.

The results were as follows:

| Sample | Apparent % Amylose | Alkali Spreading Value | Whiteness | Transparency | SMD |
|---|---|---|---|---|---|
| LC31 | 30.4 | 5.7 | | | |
| HIGH MILLING DEGREE | | | 47.4 | 1.71 | 123 |
| LOW MILLING DEGREE | | | 33.2 | 1.01 | 59 |
| LABELLE | 23.2 | 3.8 | | | |
| HIGH MILLING DEGREE | | | 45.1 | 2.77 | 118 |
| LOW MILLING DEGREE | | | 33.4 | 2.20 | 62 |

| Sample | Water-Rice Ratio | Cooked Rice Firmness (Kg.) | Stickiness Cup Test |
|---|---|---|---|
| LC 31-High SMD | 1.5 | 12.3 | 2.7 |
| | 2.0 | 8.0 | 1.8 |
| | 2.6 | 4.9 | 0.9 |
| LC 31-Low SMD | 1.5 | 15.7 | 4.2 |
| | 2.0 | 7.9 | 5.8 |
| | 2.6 | 7.2 | 2.8 |
| LABELLE-High SMD | 1.5 | 9.8 | 2.2 |
| | 2.0 | 6.3 | 1.8 |
| | 2.6 | 3.9 | 1.3 |
| LABELLE-Low SMD | 1.5 | 11.2 | 3.5 |
| | 2.0 | 8.0 | 1.6 |
| | 2.6 | 4.7 | 1.6 |

The test results showed the importance of water-rice ratio (moisture) and amylose percent in determining cooked rice texture as known in the prior art. However, the results also show that degree of milling is of equal or greater importance to cooked rice texture and that a medium amylose rice can be made to behave more like a high amylose rice by milling to a lower degree.

EXAMPLE 6

In this example six different varieties of rice, two of low amylose, two of medium amylose and two of high amylose are milled to a high degree (120 SMD) and to a low degree (70 SMD). Samples of each are cooked at three water-rice ratios as in Example 4 above and tested using the Pabst Texture Test System and the Cup Test. The results of the tests were statistically analyzed using a regression calculation and it was established that cooked rice texture (firmness and stickiness) can be estimated from a knowledge of the amylose percent by weight, milling degree, water-rice ratio and the temperature of the cooked rice in the Pabst Test cell.

These same rice varieties were then milled to provide samples of a Satake milling degree of 115, 100, 85 and 70. These samples were then cooked at the water-rice ratios required to produce cooked rice of a uniform Pabst firmness value of 6 kg. This ratio was determined from the regression equation. The cooked rice samples were then ranked in terms of grain integrity and stickiness by a team having no knowledge of the sample identities. The results were analyzed statistically and are shown in Table 4. It is clear that degree of milling has a substantial effect on cooked rice texture for rice products of differing amylose levels cooked to constant firmness.

TABLE 4
Subjective Stickiness Rating - Units
Effect of Milling Degree and Amylose %
Constant Firmness of 6 Kg by changing Water-Rice Ratio

| | Satake Milling Degree | | | | |
|---|---|---|---|---|---|
| | 70 | 85 | 100 | 115 | |
| Low Amylose - 18% | 32 | 26 | 21 | 15 | Units |
| Medium Amylose - 24% | 30 | 24 | 19 | 13 | Units |
| High Amylose - 30% | 28 | 23 | 17 | 11 | Units |

Table 4 illustrates that by changing water ratio to achieve the same firmness with rices of different amylose and milling degree it is possible to produce high milling degree, 115 SMD, intermediate amylose cooked rice which is perceived to be stickier than low amylose normal, 85 SMD, cooked rice. The subjective grain integrity and stickiness was judged by human testers applying the standard of 1 for stickiest low integrity rice and 48 for least sticky high integrity rice.

EXAMPLE 7

This example demonstrates the manner in which degree of milling can change in the course of the commercial milling of a specific variety and the need to precisely control the milling process and/or the subsequent cooking process to achieve a uniform processed product such as instant rice.

Samples of rice lots of variety RTA 1002 produced from different farms were milled in a McGill laboratory milling machine to isolate samples which differed in Total Milling Yield when milled for the same time. It was to be expected that these samples would differ in degree of milling and this was the case:

| Sample | Milling Time Seconds | % Total | % Whole | SMD |
|---|---|---|---|---|
| A | 40 | 71.5 | 58.0 | 63 |
|   | 60 | 66.8 | 50.8 | 85 |
| B | 40 | 67.8 | 46.2 | 78 |
|   | 60 | 60.5 | 37.3 | 95 |

Analyses of several lots of this variety, milled at different times over a period of several months, in a commercial mill, using conventional visual milling degree controls, showed that milling degree varied with milling efficiency. Low mill efficiency was associated with high milling degree of the tested rice and high milling efficiency was associated with low milling degree of the tested rice. Changing the milling degree in accordance with this invention has been discovered to cause changes in cooked rice texture when the rice is cooked under constant conditions. By changing the method of operating the commerical rice mill to alter mill machine settings based on the testing of incoming rice for milling efficiency by using a test miller and then supplementing the results with actual measurements of milling degree on product exiting the commercial mill using the Satake Milling Degree Meter, the range of product milling degree can be narrowed.

EXAMPLE 8

This example demonstrates the manner in which degree of milling can be used as a method of improving the uniformity of cooking behavior and cooked rice texture of milled white rice to compensate for variations in the starch properties of rouch rice being used by the mill. Example 7 illustrates the way in which ease of milling and milling degree may vary from lot to lot. These variations can be ameliorated by test milling lots fed to the mill and then modifying milling conditions to maintain constant milling degree. In this example the cooking behavior and cooked rice texture variation between lots of rice being fed to the mill is measured directly or indirectly. The milling conditions are then changed to produce milled rice of varying milling degree but more constant cooking behavior and cooked rice texture.

The amylose levels and alkali spreading values (ASV) of different lots of rice of the same variety will differ as a result of factors such as growing conditions and environment. Amylose content within a variety can vary by as much as 6 percentage points. Temperature during grain ripening has been shown to affect amylose content and ASV with both of those starch properties generally decreasing as the mean temperature increases.

The following table (from the literature) shows the effect in terms of growing latitude for two varieties:

|  | Labelle | | Nato | |
|---|---|---|---|---|
|  | % Amylose | ASV | % Amylose | ASV |
| Texas | 23.6 | 3.6 | 15.9 | 6.3 |
| Arkansas | 24.3 | 4.3 | 17.1 | 6.5 |
| California | 25.7 | 6.5 | 20.8 | 7.0 |

Similarly the variety RTA 1002, in which two crops are possible from the same planting (first crop and ratoon crop), shows an effect on alkali spreading value due to the cooler temperatures during ripening of the ratoon crop:

|  | Farm A | | Farm B | |
|---|---|---|---|---|
|  | % Amylose | ASV | % Amylose | ASV |
| First | 23.6 | 4.0 | 23.8 | 3.5 |
| Ratoon | 23.2 | 6.2 | 24.0 | 5.2 |

These changes in starch properties have an effect on cooking behavior and cooked rice texture.

One embodiment of the present invention may be used to produce a product of more uniform cooking behavior and cooked rice texture from rice of varying starch properties. First, a sample of each lot is test milled to the same milling degree, cooked and tested for product firmness and stickiness. The difference between the results are calculated and then the test milling degree of one or other or both samples is changed to achieve the same desired level of firmness and/or stickiness from the different lots. These milling degree targets may then used by the commercial mill to produce more uniform cooking rice from two lots.

This technique is illustrated in the following table. Samples from both the first and ratoon crops from Farm A were tested at the same milling degree and the ratoon crop rice was found to cook to a firmer texture. The samples were tested for firmness after cooking in an electric rice cooker at a below normal water-rice ratio of 2.00 to exaggerate the cooked rice hardness difference between samples. A normal water-rice ratio for this medium amylose rice would be 2.25.

The ratoon crop sample was then laboratory milled to a much higher degree of 113 SMD and retested. The higher milling degree resulted in a cooked rice firmness reduction of approximately 15% and the texture of the cooked rice sample was more similar to that of the first crop.

|  | First | Ratoon | Ratoon High SMD |
|---|---|---|---|
| Satake Milling Degree | 90 | 87 | 113 |
| Whiteness | 39.0 | 39.1 | 44.3 |
| Transparency | 2.7 | 2.1 | 2.5 |
| Cooked Rice Firmness Kg at 120 deg. C. | 7.1 | 8.9 | 7.6 |
| Water-Rice Ration 2.0 by wt |  |  |  |

To bring the first ratoon crop cooked product textures even more closely in line the commercial mill targets were set at an 80 SMD for the first crop and a 115 SMD for the ratoon crop.

Thus it can be seen that an invention for novel rice milling has been shown. Other embodiments of the process may be utilized without departing from the inventive concept. Steps of certain of the embodiments may be rearranged in order and the invention used to process other varieties and to produce other rice products having special texture characteristics, all as would be apparent to one skilled in the art.

What is claimed is:

1. A process for changing the cooking behavior and cooked rice texture of a given well-milled rice when cooked in a predetermined way, including the steps of:
   varying only the milling degree of said rice by
   milling said rice to a greater degree than well-milled to produce cooked white rice having substantially softer and stickier texture; or,
   milling said rice to a lesser degree than well-milled to produce cooked white rice having substantially fluffier and drier texture.

2. A process for maintaining uniform cooking behavior and cooked rice texture in a production run of a milled rice, including the combination of steps of:
   measuring the milling degree of a lot of rice conforming to determined cooking behavior and cooked rice texture qualities;
   test milling a sample of a second lot of rice of the same type in a uniform way;
   cooking a sample of said second lot of rice in a uniform manner;
   determining the differences in cooking behavior and cooked rice texture of said first lot and said second lot; and
   varying only the milling degree of said second lot of rice to compensate for differences in cooking behavior and cooked rice texture between said first lot and said second lot.

3. A process for milling dehulled rice including the steps of:
   selecting a rice having predetermined cooking behavior and qualities of texture, after cooking by a predetermined cooking procedure, when well-milled;
   varying only the milling degree of said rice to produce, after said predetermined cooking procedure, a substantially drier and fluffier rice by milling said rice to a Satake milling degree of about 78 or less and a transparency of about 2.0 or greater or to produce a substantially softer and stickier rice when cooked by milling said rice to a Satake milling degree of about 100 or greater.

4. The process as claimed in claim 3, wherein:
   the apparent amylose content of said rice milled to more than 100 Satake milling degrees is greater than about 19% by weight.

5. A milled rice produced according to the process of claim 3 and possessing the characteristics selected from the groups consisting of (a) a Satake milling degree of about 100 or greater and having greater than about 19% apparent amylose content by weight, and (b) a Satake milling degree of about 78 or less and a transparency of about 2.0 or greater.

6. A process for milling dehulled rice having predetermined cooking behavior and qualities of texture after cooking by a predetermined cooking procedure when well milled, including the steps of:
   milling said rice to about 78 Satake milling degrees or less, thereby increasing the dryness and fluffiness of the milled rice when cooked, while increasing the transparency of the milled rice above about 2.0;
   or milling said rice to about 100 Satake milling degrees or more, thereby increasing the softness and stickiness of the milled rice when cooked.

7. The process as claimed in claim 6, wherein:
   the apparent amylose content of said rice milled to about 100 Satake milling degrees or more is greater than about 19% by weight.

8. A process for changing cooked rice texture and cooking behavior of a given dehulled and well-milled rice when cooked by a consistent cooking procedure, including the step of:
   varying the Satake milling degree of said milled rice to about 100 or more to produce a softer and more sticky rice or to about 78 or less to produce a firmer and less sticky rice, while increasing transparency of said milled rice to greater than about 2.0.

9. A process for milling rice, including the combination of steps of:
   selecting a rice type having predetermined qualities of cooking behavior and texture when dehulled, well milled and cooked following a predetermined cooking procedure;
   milling said rice to a set of parameters selected from the groups consisting of:
   (a) a Satake milling degree of about 100 or greater and an apparent amylose content greater than about 19% by weight; and
   (b) a Satake milling degree of about 78 or less and a transparency of 2.0 or greater,
   thereby producing a softer and stickier cooked rice texture when milled to the parameters of group (a) and firmer and less sticky rice when milled to the parameters of group (b).

* * * * *